APPARATUS FOR CONTROLLING AND SYNCHRONIZING TIMEPIECES

Filed Oct. 1, 1963

INVENTORS
MASASHI SUGANO
AND MICHIO YOSHIOKO

BY Robert E. Burns

United States Patent Office 3,323,025

Patented May 30, 1967

3,323,025
APPARATUS FOR CONTROLLING AND SYNCHRONIZING TIMEPIECES

Masashi Sugano, Nerima-ku, Tokyo-to, and Michio Yoshioka, Setagaya-ku, Tokyo-to, Japan, assignors to Kokusai Denki Kabushiki Kaisha, Tokyo-to, Japan, a joint-stock company of Japan Filed Oct. 1, 1963, Ser. No. 313,030
Claims priority, application Japan, Apr. 15, 1963, 38/19,435
4 Claims. (Cl. 317—147)

Figures 1, 2:
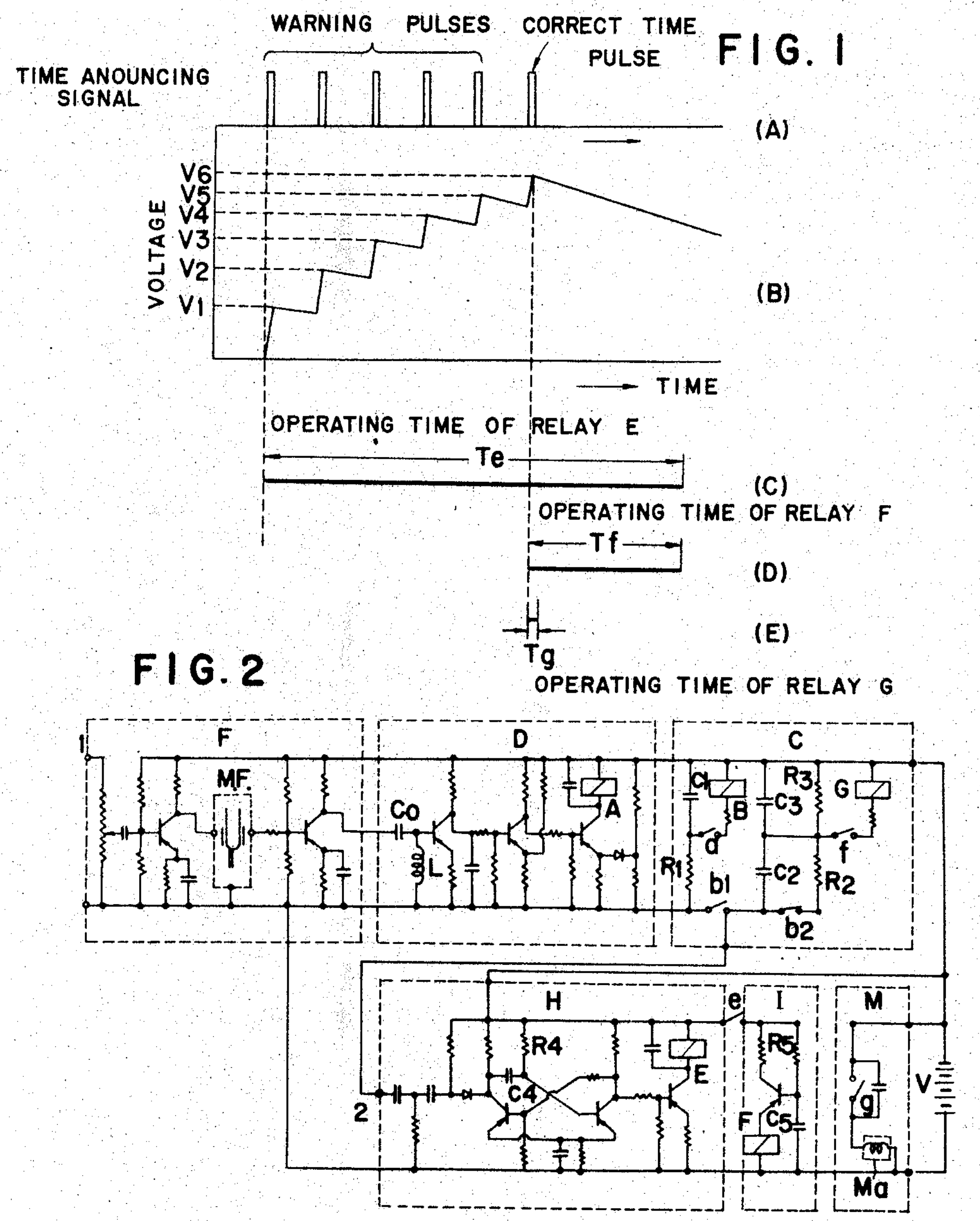

This invention relates to a detector circuit for time-announcing signals utilized in radio control clock devices and the like for the purpose of automatically correcting the errors of the clock device in response to time announcing signals broadcast by radio waves, and has the object of providing a novel circuit which can accurately detect correct time announcing signals which have accompanying warning pulse signals of predetermined repeating frequencies. Both the warning and time-announcing signals being interposed between irregular signals in the radio broadcast waves such as those of voice or music signals.

In accordance with the invention, apparatus for controlling and synchronizing clocks in dependence on a time announcing signal comprising one or more warning signals of a first frequency and a correct time signal of the same or other frequency, comprises a frequency selecting detector circuit arranged to select and rectify said warning signal or signals and said correct time signal, a counting circuit arranged to accumulate successively, in response to each of said rectified signals, an electric charge on a capacitive element, a control circuit arranged to discharge said accumulated electric charge upon the reception by the counting circuit of said correct time signal, and an electromagnetic device arranged to drive clock time correcting means in response to said discharge of the accumulated electric charge.

The features of the present invention which are believed to be novel are set forth particularly in the appended claims. The invention itself, however, as to its organization together with further objects and advantages thereof, may best be understood by reference to the following description taken in connection with the accompanying drawings, in which:

FIG. 1 is a graph of pulses illustrating timing relation for explaining the principle of operation of this invention; and FIG. 2 is a circuit diagram of one embodiment of this invention.

As an illustrative example of this invention, a detector circuit designed to detect time announcing signals each consisting of six pulses of 1000 cycles per second is considered in the following description.

FIG. 1(A) shows a train of time announcing signals consisting of five warning or preliminary pulses and one correct time pulse.

Referring to FIG. 2, voice input signals detected by a radio receiver (not shown) are applied to a terminal 1 at the left side of FIG. 2. These input signals are applied to a filter circuit F including a low frequency mechanical filter M.F. (1000 c./s.) having a sharp selective characteristic to select the desired time announcing signals from other undesired signals such as noises, voices, music, and the like. The selected time announcing signals are then supplied to a rectifier circuit D, a series capacitance $C_0$ and a parallel inductance L of the rectifier circuit being designed such that their tuning point is selected close to the frequency of the time announcing signals so as to provide the function of a high-pass filter to supplement the selective characteristic of said filter circuit F, while, at the same time, to lower the base input impedance of the rectifying transistor, and thereby to provide stable rectified output which is utilized to operate a relay A. This relay A, when actuated, initiates operation of a counting circuit C. In other words, the contact *a* of the relay A closes to discharge the electric charge previously stored in a capacitor $C_1$, so that its discharging current actuates a relay B to close the contact $b_1$ and to open the contact $b_2$. When the contact $b_1$ closes, the input potential at the input terminal 2 of a time holding circuit H quickly changes from negative to positive. This positive potential functions to trigger a monostable multivibrator to actuate a relay E for a time interval of $Te=0.7C_4.R_4$, where $C_4$ is the capacitance of a capacitor $C_4$ and $R_4$ is the resistance of a resistor $R_4$ included in the monostable multivibrator. This time interval T*e* is shown by FIG. 1C.

When the relay E is actuated, it closes the contact *e* to energize an integration circuit I so as to actuate a relay F at an instant which is later than said energization by a time interval which is equal to the time constant determined by a capacitor $C_5$ and a resistor $R_5$ which are included in the integration circuit I.

The counting circuit C operates as follows:

The voltage $V_1$ which is charged in the capacitor $C_3$ by the first time announcing pulse as mentioned above is represented by the following Equation 1 in terms of the main power supply voltage V.

$$V_1=\frac{C_2}{C_2+C_3}V=VK \qquad (1)$$

where $$K=\frac{C_2}{C_2+C_3}$$

In this equation $C_2$ and $C_3$ represent the capacitors serially connected in the counting circuit and V represents the voltage of a direct current source shown as a storage battery. Now, assuming that the time spacing between the first and second time announcing signal pulses is equal to one second, the terminal voltage $V_1'$ across the capacitor $C_3$ after one second will be represented by the following Equation 2 owing to the resistor $R_3$ being connected in parallel with the capacitor $C_3$.

$$V_1'=VKe-\frac{1}{C_3R_3} \qquad (2)$$

It is to be understood that the capacitor $C_2$ which is connected in series with the capacitor $C_3$ is required to be designed to complete discharge through a discharge resistor $R_2$ within one second.

When the second time announcing signal pulse is applied to the input terminal, the capacitor $C_3$ is charged again by the same operation as before, but this time the terminal voltage $V_2$ of the capacitor $C_3$ becomes as follows:

$$V_2=VK1+(1-K)e^{-\frac{1}{C_3R_3}} \qquad (3)$$

By these repeating pulses, the terminal voltage of $C_3$ is gradually built up while repeating charging and discharging, and the terminal voltage $V_6$, for instance at the sixth correct time announcing signal pulse can be represented by $$V6=VK[1+(1-K)e^{-\alpha}+(1-K)^2e^{-2\alpha}+(1-K)^3e^{-3\alpha}+(1-K)^4e^{-4\alpha}+(1-K)^5e^{-5\alpha}] \qquad (4)$$

where $\alpha=1/C_3R_3$

This accumulated terminal voltage is represented by a curve of FIG. 1(B).

Returning again to the counting circuit C of FIG. 2, it is to be understood that by setting the operating voltage of the relay G of the counting circuit higher than the terminal voltage $V_5$ of the capacitor $C_3$ and lower than the terminal voltage $V_6$, and further by setting the relay F in the integration circuit I to initiate operation just before completion of the last pulse of the correct time announcing signal as shown in FIGS. 1(A) and (D), or, just before the terminal voltage of the capacitor $C_3$ reaches $V_6$ (see FIG. 1(B)), relay F operates almost simultaneously with the arrival of the last pulse of the correct time announcing signal, closes the contact *f* and actuates the relay G, the operating time T*g* in this case being shown in FIG. 1(E). When the relay G starts operation, the contact *g* in a magnet circuit M closes to energize the excitation coil of the magnet M' by a current supplied by the main power supply voltage V, thereby making possible correction of the time of a radio control clock device or the like (not shown).

By designing the relay F to operate over time interval $T_f$ which terminates somewhat later than the termination of the time announcing pulses so as to rapidly discharge the spurious charged voltage of the capacitor $C_3$ after detection of the correct time pulse, it is possible to eliminate any erroneous operation after completion of the time announcing pulses.

It is also possible to prevent erroneous operations caused by signals other than the time announcing pulses by setting the charging and discharging resistors and a capacitor so that the relay B associated therewith may be operated only by the predetermined time announcing signals with definite pulse spacings.

As is clear from the above description, the apparatus of this invention is constructed so that the pulses for time-announcing signals are selected by introducing the output of a receiver into the wave filter circuit. The electric voltage is stored in turn in response to the number of the signals, and then only when the stored electric charge has attained a certain value or more can the control device of the hands of the timekeeper be operated. Also only in case of arrival of the correct time pulse, is the stored electric charge discharged by the integration circuit which has a proper time constant, whereby accurate operation is carried out when the time announcing signals are received and erroneous operation caused by signals other than the time-announcing signals is prevented. Therefore, the present invention is very effective in detectors for time-announcing signals.

The circuits of this invention can be equally applied to other types of time announcing signals in which, for instance, frequencies of warning pulses and a correct time pulse are different. In such a case, the circuit F is comprised of two parallel connected filters of different frequencies.

While the invention has been explained by describing particular embodiments thereof, it will be apparent that improvements and modifications may be made without departing from the scope of the invention as defined in the appended claims.

What we claim is:

1. Apparatus for controlling and synchronizing clocks in dependence on a time-announcing signal comprising at least one warning signal of a first frequency and a correct time signal of the same or other frequency, said apparatus comprising a frequency-selecting detector circuit having means to select and rectify said warning signal and said correct time signal, a counting circuit connected to said detector circuit having means to accumulate successively, in response to each of said rectified signals, an electric charge, a control circuit connected to said counting circuit to discharge said accumulated electric charge upon the reception by said counting circuit of said correct time signal, and an electromagnetic device under control of said control circuit to drive clock time correcting means in response to said discharge of the accumulated electric charge.

2. Apparatus according to claim 1, in which said control circuit comprises an integration circuit and a holding circuit, said integration circuit having means defining a time constant selected so that its operation commences upon receipt of the initial signal of the time announcing signal and including a relay operative to cause said discharge of the accumulated electric charge, a D.C. power source, and said holding circuit having means to connect said D.C. power source to said integration circuit upon receipt of the initial signal of the time announcing signal and to maintain said connection until completion of the discharge of said accumulated electric charge.

3. Apparatus according ot claim 1, in which said time-announcing signal comprises a series of warning pulses followed by a single correct time pulse and in which said frequency-selecting detector circuit comprises means to which said time-announcing signal is applied.

4. Apparatus according to claim 3, in which said warning pulses and said correct time pulse have the same pulse width, and in which said frequency-selecting detector circuit comprises filter means.

No references cited.

MILTON O. HIRSHFIELD, *Primary Examiner.*

KATHLEEN H. CLAFFY, *Examiner.*

R. LINN, J. A. SIVERMAN, *Assistant Examiners.*